United States Patent
Jungnickel et al.

(10) Patent No.: US 11,672,633 B2
(45) Date of Patent: Jun. 13, 2023

(54) HANDLE FOR AN ELECTRICALLY OPERATED PERSONAL CARE IMPLEMENT

(71) Applicant: The Gillette Company LLC, Boston, MA (US)

(72) Inventors: Uwe Jungnickel, Königstein (DE); Martin Brust, Aachen (DE); Marcel Denis Knorr, Frankfurt am Main (DE); Andreas Reuschenbach, Bad Soden (DE); Markus Morgott, Eschborn (DE)

(73) Assignee: The Gillette Company, LLC., Boston, MA (US)

( * ) Notice: Subject to any disclaimer, the term of this patent is extended or adjusted under 35 U.S.C. 154(b) by 137 days.

(21) Appl. No.: 17/090,980

(22) Filed: Nov. 6, 2020

(65) Prior Publication Data

US 2021/0128286 A1 May 6, 2021

(30) Foreign Application Priority Data

Nov. 6, 2019 (EP) .................................... 19207432

(51) Int. Cl.
*A61C 17/22* (2006.01)
(52) U.S. Cl.
CPC ................. *A61C 17/225* (2013.01)
(58) Field of Classification Search
CPC .... A61V 17/16; A61V 15/047; A61V 17/225; A45D 29/05; A47K 7/04; A46D 3/005
USPC ........................................................ 15/22.1
See application file for complete search history.

(56) References Cited

U.S. PATENT DOCUMENTS

| 3,103,680 | A | 9/1963 | Abraham |
| 3,927,435 | A | 12/1975 | Moret |
| 4,384,645 | A | 5/1983 | Manfredi |
| 4,811,445 | A | 3/1989 | Lagieski et al. |
| 5,109,563 | A | 5/1992 | Lemon et al. |

(Continued)

FOREIGN PATENT DOCUMENTS

| CN | 2320102 | 5/1999 |
| CN | 1223834 | 7/1999 |

(Continued)

OTHER PUBLICATIONS

U.S. Appl. No. 29/746,709, filed Aug. 17, 2020, Christine Hallein et al.

(Continued)

*Primary Examiner* — Katina N. Henson
(74) *Attorney, Agent, or Firm* — Gregory S. Darley-Emerson

(57) ABSTRACT

A handle for an electrically operated personal-care implement includes a metal tube housing having a metal wall with an opening and an inner surface, the inner surface defining an inner cavity of the housing for accommodating an energy source, and a switch assembly for activating the energy source. The switch assembly, including a hard switch component and a soft switch component, is arranged in the opening and seals the opening from the inner surface of the wall. The hard switch component comprises a frame having a recess and attached to the inner surface of the metal wall thereby surrounding the opening and providing an undercut between the recess and the inner surface. The undercut is open to the opening, and the soft switch component is positioned in the undercut to at least partially cover the opening.

18 Claims, 6 Drawing Sheets

(56) References Cited

U.S. PATENT DOCUMENTS

| | | |
|---|---|---|
| 5,335,389 A | 8/1994 | Curtis et al. |
| 5,361,446 A | 11/1994 | Rufo |
| 5,369,835 A | 12/1994 | Clarke |
| 5,875,510 A | 3/1999 | Lamond et al. |
| 5,956,796 A | 9/1999 | Lodato |
| 5,992,423 A | 11/1999 | Tevolini |
| 6,015,328 A | 1/2000 | Glaser |
| 6,086,373 A | 7/2000 | Schiff |
| 6,230,716 B1 | 5/2001 | Minoletti |
| 6,308,367 B1 | 10/2001 | Beals et al. |
| 6,643,886 B2 | 11/2003 | Moskovich |
| 6,671,919 B2 | 1/2004 | Davis |
| 6,871,373 B2 | 3/2005 | Driesen |
| 7,137,166 B1 | 11/2006 | Kraemer |
| 8,387,197 B2 | 3/2013 | Moskovich |
| 8,563,020 B2 | 10/2013 | Uhlmann |
| 8,727,141 B2 | 5/2014 | Akalin |
| 8,931,855 B1 | 1/2015 | Foley et al. |
| 8,966,697 B2 | 3/2015 | Kim et al. |
| 9,049,921 B1 | 6/2015 | Rackston |
| 9,066,579 B2 | 6/2015 | Hess |
| 9,161,544 B2 | 10/2015 | Agrawal et al. |
| 9,168,117 B2 | 10/2015 | Yoshida et al. |
| 9,226,508 B2 | 1/2016 | Uhlmann et al. |
| 9,265,335 B2 | 2/2016 | Foley et al. |
| 9,402,461 B2 | 8/2016 | Brik et al. |
| 9,427,077 B1 | 8/2016 | Zhang |
| D775,469 S | 1/2017 | Sikora et al. |
| 9,539,750 B2 | 1/2017 | Gross et al. |
| 9,609,940 B2 | 4/2017 | Corbett |
| 9,642,682 B2 | 5/2017 | Kato |
| D814,195 S | 4/2018 | Sikora et al. |
| 10,195,005 B2 | 2/2019 | Wallström et al. |
| 10,667,892 B2 | 6/2020 | Bärtschi et al. |
| 10,792,136 B2 | 10/2020 | May et al. |
| D901,183 S | 11/2020 | Jungnickel et al. |
| D912,988 S | 3/2021 | Langhammer |
| D917,298 S | 4/2021 | Hallein et al. |
| D926,048 S | 7/2021 | Hallein et al. |
| D926,049 S | 7/2021 | Hallein et al. |
| D927,972 S | 8/2021 | Hallein et al. |
| D930,990 S | 9/2021 | Hallein et al. |
| D931,617 S | 9/2021 | Hallein et al. |
| D931,619 S | 9/2021 | Hallein et al. |
| D933,368 S | 10/2021 | Albay et al. |
| D936,484 S | 11/2021 | Hallein et al. |
| 2003/0115706 A1 | 6/2003 | Ponzini |
| 2004/0016073 A1 | 1/2004 | Knutson |
| 2004/0060138 A1 | 4/2004 | Pfenniger et al. |
| 2005/0022322 A1 | 2/2005 | Jimenez et al. |
| 2005/0268414 A1 | 12/2005 | Kim |
| 2005/0286967 A1 | 12/2005 | Blauzdys |
| 2006/0086370 A1 | 4/2006 | Omeara |
| 2008/0120795 A1 | 5/2008 | Reinbold |
| 2008/0220235 A1 | 9/2008 | Izumi |
| 2009/0089950 A1 | 4/2009 | Moskovich et al. |
| 2010/0115724 A1 | 5/2010 | Huang |
| 2010/0282274 A1 | 11/2010 | Huy |
| 2011/0016651 A1 | 1/2011 | Piserchio |
| 2011/0146015 A1 | 6/2011 | Moskovich |
| 2011/0314677 A1* | 12/2011 | Meier ............... A46B 15/0002 30/41.8 |
| 2012/0036663 A1 | 2/2012 | Chen |
| 2012/0073072 A1 | 3/2012 | Moskovich et al. |
| 2012/0090117 A1 | 4/2012 | Akalin |
| 2012/0198640 A1 | 8/2012 | Jungnickel et al. |
| 2012/0227200 A1 | 9/2012 | Kraemer |
| 2012/0301528 A1 | 11/2012 | Uhlmann |
| 2012/0301530 A1 | 11/2012 | Uhlmann et al. |
| 2012/0301531 A1 | 11/2012 | Uhlmann et al. |
| 2012/0301533 A1 | 11/2012 | Uhlmann et al. |
| 2013/0000059 A1 | 1/2013 | Jungnickel et al. |
| 2013/0171225 A1 | 7/2013 | Uhlmann et al. |
| 2013/0291326 A1 | 11/2013 | Mintel |
| 2013/0315972 A1 | 11/2013 | Krasnow et al. |
| 2014/0137349 A1 | 5/2014 | Newman |
| 2014/0259474 A1 | 9/2014 | Sokol et al. |
| 2014/0359957 A1 | 12/2014 | Jungnickel |
| 2014/0359958 A1 | 12/2014 | Jungnickel |
| 2015/0034858 A1 | 2/2015 | Raman |
| 2015/0143651 A1 | 5/2015 | Foley et al. |
| 2015/0147372 A1 | 5/2015 | Agrawal et al. |
| 2015/0245618 A9 | 9/2015 | Agrawal et al. |
| 2015/0289635 A1 | 10/2015 | Erskine-Smith |
| 2015/0305487 A1 | 10/2015 | Pardo et al. |
| 2015/0351406 A1 | 12/2015 | Wingfield et al. |
| 2016/0135579 A1 | 5/2016 | Tschol et al. |
| 2016/0135580 A1 | 5/2016 | Tschol et al. |
| 2016/0220014 A1 | 8/2016 | Sprosta |
| 2017/0079418 A1 | 3/2017 | Mintel |
| 2017/0347782 A1 | 12/2017 | Jimenez et al. |
| 2017/0347786 A1 | 12/2017 | Jimenez et al. |
| 2017/0367469 A1 | 12/2017 | Jimenez et al. |
| 2018/0016408 A1 | 1/2018 | Stibor |
| 2018/0055206 A1 | 3/2018 | Nelson et al. |
| 2018/0311023 A1 | 11/2018 | Yao |
| 2019/0000223 A1 | 1/2019 | Alinski |
| 2019/0069978 A1 | 3/2019 | Katano et al. |
| 2019/0117356 A1 | 4/2019 | Bärtschi et al. |
| 2019/0175320 A1 | 6/2019 | Bloch et al. |
| 2019/0200740 A1 | 7/2019 | Jungnickel |
| 2019/0200742 A1 | 7/2019 | Jungnickel |
| 2019/0200743 A1 | 7/2019 | Jungnickel |
| 2019/0200748 A1 | 7/2019 | Görich |
| 2019/0246779 A1 | 8/2019 | Jungnickel et al. |
| 2019/0246780 A1 | 8/2019 | Jungnickel et al. |
| 2019/0246781 A1 | 8/2019 | Jungnickel et al. |
| 2019/0248049 A1 | 8/2019 | Jungnickel et al. |
| 2020/0022793 A1 | 1/2020 | Scherrer et al. |
| 2020/0077778 A1 | 3/2020 | Jungnickel |
| 2020/0121069 A1 | 4/2020 | Jungnickel |
| 2020/0305588 A1 | 10/2020 | Jungnickel |
| 2021/0120948 A1 | 4/2021 | Görich et al. |
| 2021/0212446 A1 | 7/2021 | Jungnickel |
| 2021/0212447 A1 | 7/2021 | Jungnickel et al. |
| 2021/0212448 A1 | 7/2021 | Jungnickel |
| 2021/0220101 A1 | 7/2021 | Jungnickel et al. |
| 2021/0259818 A1 | 8/2021 | Jungnickel et al. |
| 2021/0307496 A1 | 10/2021 | Jungnickel et al. |
| 2021/0315368 A1 | 10/2021 | Jungnickel |
| 2021/0315369 A1 | 10/2021 | Jungnickel |
| 2021/0315370 A1 | 10/2021 | Jungnickel |
| 2021/0315675 A1 | 10/2021 | Jungnickel |

FOREIGN PATENT DOCUMENTS

| | | |
|---|---|---|
| CN | 1229341 A | 9/1999 |
| CN | 1229622 | 9/1999 |
| CN | 2346277 | 11/1999 |
| CN | 1241123 A | 1/2000 |
| CN | 201036392 | 3/2008 |
| CN | 201185740 | 1/2009 |
| CN | 201563874 U | 9/2010 |
| CN | 201630520 | 11/2010 |
| CN | 201675294 | 12/2010 |
| CN | 201861064 | 6/2011 |
| CN | 201861068 | 6/2011 |
| CN | 202035662 | 11/2011 |
| CN | 202269590 U | 6/2012 |
| CN | 202286879 | 7/2012 |
| CN | 202476817 | 10/2012 |
| CN | 102907880 | 2/2013 |
| CN | 102948997 | 3/2013 |
| CN | 202820100 | 3/2013 |
| CN | 202941615 | 5/2013 |
| CN | 202980745 | 6/2013 |
| CN | 103829559 | 6/2014 |
| CN | 103844575 | 6/2014 |
| CN | 104768420 A | 7/2015 |
| CN | 105054571 | 11/2015 |
| CN | 205082879 | 3/2016 |
| CN | 105534002 | 5/2016 |
| CN | 105750734 | 7/2016 |
| CN | 105818322 | 8/2016 |

(56) References Cited

FOREIGN PATENT DOCUMENTS

| | | |
|---|---|---|
| CN | 205568222 | 9/2016 |
| CN | 106132244 A | 11/2016 |
| CN | 106793866 A | 5/2017 |
| CN | 206714397 | 12/2017 |
| CN | 207055161 | 3/2018 |
| CN | 109259882 A | 1/2019 |
| CN | 111713845 A | 9/2020 |
| DE | 3241118 A1 | 8/1984 |
| DE | 4412301 A1 | 10/1995 |
| DE | 202005002964 | 7/2005 |
| DE | 202006019788 | 8/2007 |
| DE | 102006051649 | 5/2008 |
| DE | 202015002964 U1 | 8/2015 |
| EP | 0100975 A2 | 2/1984 |
| EP | 0481553 A1 | 4/1992 |
| EP | 2117395 A2 | 11/2009 |
| EP | 2218559 A1 | 8/2010 |
| EP | 3090646 | 11/2016 |
| EP | 3381404 A1 | 10/2018 |
| EP | 3501333 | 6/2019 |
| FR | 2835176 | 8/2003 |
| GB | 766486 | 1/1957 |
| GB | 2493409 | 2/2013 |
| JP | 61020509 | 1/1986 |
| JP | S63284262 | 11/1988 |
| JP | H0669408 | 3/1994 |
| JP | 2561978 | 12/1996 |
| JP | 2619825 | 6/1997 |
| JP | H1199016 A | 4/1999 |
| JP | 2003009951 | 1/2003 |
| JP | 2003245132 | 9/2003 |
| JP | 2004089471 | 3/2004 |
| JP | 2005053973 | 3/2005 |
| JP | 4076405 | 2/2008 |
| JP | 2009011621 | 1/2009 |
| JP | 2011045621 | 3/2011 |
| JP | 2011087747 | 5/2011 |
| JP | 2015231500 A | 12/2015 |
| JP | 6160619 B2 | 6/2017 |
| JP | 3213325 | 11/2017 |
| KR | 20060042059 A | 5/2006 |
| KR | 20070013844 | 1/2007 |
| KR | 20090030829 | 3/2009 |
| KR | 20100043124 A | 4/2010 |
| KR | 101142611 | 5/2012 |
| KR | 20130006243 U | 10/2013 |
| KR | 101339558 | 12/2013 |
| KR | 200473116 | 6/2014 |
| KR | 20150057308 | 5/2015 |
| KR | 20150105813 | 9/2015 |
| KR | 101591299 | 2/2016 |
| KR | 20160121554 A | 10/2016 |
| KR | 20160125725 | 11/2016 |
| KR | 20170062779 | 6/2017 |
| KR | 101847473 B1 | 4/2018 |
| KR | 200486759 Y1 | 6/2018 |
| KR | 101987341 B1 | 6/2019 |
| RU | 2141238 | 11/1999 |
| WO | 9510959 | 4/1995 |
| WO | 9838889 | 9/1998 |
| WO | 9844823 A2 | 10/1998 |
| WO | 2005002826 A1 | 1/2005 |
| WO | 2005030002 | 4/2005 |
| WO | 200641658 | 4/2006 |
| WO | 2008098107 A2 | 8/2008 |
| WO | 2009045982 A1 | 4/2009 |
| WO | 2012126126 | 9/2012 |
| WO | 2012144328 | 10/2012 |
| WO | 2013076904 | 5/2013 |
| WO | 2013101300 A1 | 7/2013 |
| WO | 2013158741 | 10/2013 |
| WO | 2014193621 | 12/2014 |
| WO | 2015061651 A1 | 4/2015 |
| WO | 2016189407 A1 | 12/2016 |
| WO | 2017173768 A1 | 10/2017 |
| WO | 2018025751 | 2/2018 |
| WO | 2019072925 A1 | 4/2019 |
| WO | 2019157787 A1 | 8/2019 |

OTHER PUBLICATIONS

U.S. Appl. No. 29/659,068, filed Aug. 6, 2020, Christine Hallein et al.
U.S. Appl. No. 29/787,707, filed Jun. 8, 2021, Uwe Jungnickel et al.
U.S. Appl. No. 29/746,718, filed Aug. 17, 2020, Dominik Langhammer.
U.S. Appl. No. 29/757,499, filed Nov. 6, 2020, Christine Hallein et al.
U.S. Appl. No. 29/761,086, filed Dec. 7, 2020, Christine Hallein et al.
U.S. Appl. No. 29/752,093, filed Sep. 29, 2020, Uwe Jungnickel et al.
U.S. Appl. No. 29/752,912, filed Sep. 29, 2020, Uwe Jungnickel et al.
U.S. Appl. No. 29/762,793, filed Dec. 18, 2020, Uwe Jungnickel et al.
U.S. Appl. No. 29/787,712, filed Jun. 8, 2021, Uwe Jungnickel et al.
U.S. Appl. No. 29/699,695, filed Jul. 29, 2019, Niclas Altmann et al.
U.S. Appl. No. 29/743,560, filed Jul. 22, 2020, Devran Albay et al.
U.S. Appl. No. 29/758,268, filed Nov. 13, 2020, Devran Albay et al.
U.S. Appl. No. 29/758,249, filed Nov. 13, 2020, Devran Albay et al.
U.S. Appl. No. 29/758,251, filed Nov. 13, 2020, Devran Albay et al.
U.S. Appl. No. 29/758,276, filed Nov. 13, 2020, Devran Albay et al.
U.S. Appl. No. 29/758,274, filed Nov. 13, 2020, Devran Albay et al.
U.S. Appl. No. 29/786,732, filed Jun. 2, 2021, Devran Albay et al.
U.S. Appl. No. 29/786,746, filed Jun. 2, 2021, Devran Albay et al.
U.S. Appl. No. 29/782,323, filed May 6, 2021, Christine Hallein et al.
All Office Actions; U.S. Appl. No. 16/225,509, filed Dec. 19, 2018.
All Office Actions; U.S. Appl. No. 16/225,592, filed Dec. 19, 2018.
All Office Actions; U.S. Appl. No. 16/225,688, filed Dec. 19, 2018.
All Office Actions; U.S. Appl. No. 16/225,809, filed Dec. 19, 2018.
All Office Actions; U.S. Appl. No. 16/272,392, filed Feb. 11, 2019.
All Office Actions; U.S. Appl. No. 16/272,422, filed Feb. 11, 2019.
All Office Actions; U.S. Appl. No. 16/272,872, filed Feb. 11, 2019.
All Office Actions; U.S. Appl. No. 16/272,943, filed Feb. 11, 2019.
All Office Actions; U.S. Appl. No. 16/551,307, filed Aug. 26, 2019.
All Office Actions; U.S. Appl. No. 16/551,399, filed Aug. 26, 2019.
All Office Actions; U.S. Appl. No. 17/077,639, filed Oct. 22, 2020.
All Office Actions; U.S. Appl. No. 17/155,167, filed Jan. 22, 2021.
All Office Actions; U.S. Appl. No. 17/155,208, filed Jan. 22, 2021.
All Office Actions; U.S. Appl. No. 17/218,573, filed Mar. 31, 2021.
All Office Actions; U.S. Appl. No. 17/218,742, filed Mar. 31, 2021.
All Office Actions; U.S. Appl. No. 17/219,989, filed Apr. 1, 2021.
All Office Actions; U.S. Appl. No. 17/225,259, filed Apr. 8, 2021.
All Office Actions; U.S. Appl. No. 17/225,283, filed Apr. 8, 2021.
All Office Actions; U.S. Appl. No. 17/225,296, filed Apr. 8, 2021.
All Office Actions; U.S. Appl. No. 17/225,411, filed Apr. 8, 2021.
All Office Actions; U.S. Appl. No. 17/354,027, filed Jun. 22, 2021.
All Office Actions; U.S. Appl. No. 17/462,089, filed Aug. 31, 2021.
All Office Actions; U.S. Appl. No. 16/829,585, filed Mar. 25, 2020.
PCT Search Report and Written Opinion for PCTUS2020/058820 dated Dec. 15, 2020.
Extended European Search Report and Search Opinion; Application Ser. No. 19207432.6; dated Apr. 21, 2020; 7 pages.
Unpublished U.S. Appl. No. 17/462,089, filed Oct. 31, 2021, to first inventor et al.
All Office Actions; U.S. Appl. No. 17/511,103, filed Oct. 26, 2021.
All Office Actions; U.S. Appl. No. 17/517,928, filed Nov. 3, 2021.
All Office Actions; U.S. Appl. No. 17/517,937, filed Nov. 3, 2021.
All Office Actions; U.S. Appl. No. 17/517,957, filed Nov. 3, 2021.
All Office Actions; U.S. Appl. No. 17/517,975, filed Nov. 3, 2021.
All Office Actions; U.S. Appl. No. 17/517,990, filed Nov. 3, 2021.
All Office Actions; U.S. Appl. No. 17/517,999, filed Nov. 3, 2021.
All Office Actions; U.S. Appl. No. 17/518,009, filed Nov. 3, 2021.
Unpublished U.S. Appl. No. 17/511,103, filed Oct. 26, 2021, to first inventor et al.

(56) References Cited

OTHER PUBLICATIONS

Unpublished U.S. Appl. No. 17/517,928, filed Nov. 3, 2021 to first inventor et al.
Unpublished U.S. Appl. No. 17/517,937, filed Nov. 3, 2021, to first inventor et al.
Unpublished U.S. Appl. No. 17/517,957, filed Nov. 3, 2021, to first inventor et al.
Unpublished U.S. Appl. No. 17/517,975, filed Nov. 3, 2021, to first inventor et al.
Unpublished U.S. Appl. No. 17/517,990, filed Nov. 3, 2021, to first inventor et, al.
Unpublished U.S. Appl. No. 17/517,999, filed Nov. 3, 2021 to first inventor et al.
Unpublished U.S. Appl. No. 17/518,009), filed Nov. 3, 2021 to first inventor et al.
U.S. Appl. No. 29/819,318, filed Dec. 14, 2021, Devran Albay et al.
U.S. Appl. No. 29/814,060, filed Nov. 3, 2021, Christine Hallein et al.
U.S. Appl. No. 29/814,616, filed Nov. 8, 2021, Christine Hallein et al.
All Office Actions; U.S. Appl. No. 18/100,730, filed Jan. 24, 2023.
Unpublished U.S. Appl. No. 18/100,730, filed Jan. 24, 2023 to Gerald Gorich et al.
CAEtool, Density of Materials, Retrieved from Internet: https://caetool.com/2017/10/12/p0016/, Dec. 12, 2022, 3 pages.

* cited by examiner

HANDLE FOR AN ELECTRICALLY OPERATED PERSONAL CARE IMPLEMENT

FIELD OF THE INVENTION

The present disclosure is concerned with a handle for an electrically operated personal-care implement, the handle comprising a metal tube housing. The present disclosure is further concerned with a personal-care implement comprising such handle.

BACKGROUND OF THE INVENTION

Personal-care implements, such as toothbrushes, are well known in the art. Generally, tufts of bristles for cleaning teeth are attached to a bristle carrier or mounting surface of a brush head intended for insertion into a user's oral cavity. A handle, usually attached to the head, is held by the user during brushing. Usually, heads of manual toothbrushes are permanently connected to the handle, e.g., by injection-molding the bristle carrier, the handle, a neck connecting the head and the handle, in one injection-molding step. After the usual lifetime of a toothbrush, i.e., after about three months of usage, the toothbrush is discarded. In order to provide environmentally friendly/sustainable toothbrushes, generating less waste when the brushes are discarded, manual and electrically operated toothbrushes are known to comprise heads or head refills that are exchangeable, i.e., repeatedly attachable to and detachable from the handle. Instead of buying a completely new toothbrush, consumers can reuse the handle and buy a new head refill only.

Electrically operated toothbrushes exhibit the advantage of assisting users during brushing while facilitating improved cleansing of the teeth and gums, in particular in hard-to-reach areas in the mouth. Typically, handles for electrical hand-held devices comprise a housing made from plastic materials to accommodate an energy source, e.g., a battery. While the housing itself is usually molded out of a hard-plastic material, such as, e.g., PP (polypropylene) or ABS (acrylonitrile butadiene styrene), a switch area for operating the electrical device is molded out of a soft elastomeric material, such as, e.g., TPE (thermoplastic elastomer), which forms a substantially waterproof membrane allowing actuation of a switch located within the housing. However, in order to allow for a substantially waterproof sealing and sufficient bonding between the switch and the housing by overmolding of a soft component (that forms the switch) onto the hard-plastic housing, specific material combinations and geometries of the bonding area have to be selected.

It has been found out that with respect to premium personal-care products, a consumer is especially delighted to have the product's outer housing made from real metal rather than from plastic material. Beside higher value impression of metal vs. plastic, a metal housing has the advantage of allowing for a much thinner wall of the housing, while still ensuring high durability and stability of the housing. Further, the overall product design can be provided with slimmer appearance.

It has been found out that such metal housings bring new challenge in creating a waterproof switch area. As the metal housing is not free-formed (as opposed to conventional plastic parts), but has the form of a simple metal tube, the bonding area between the components is limited, and a switch area/element cannot be simply overmolded onto the housing (as is done in instances of plastic parts). Also, the relatively thin metal wall thickness causes reduced freedom in designing the housing. The bonding force between the switch area/element and the metal tube may not be sufficient to withstand regular stress occurring during use of the switch. Peel stress in the bonding area weakens the bonding connection which may result in gaps allowing water to enter the inner part of the housing. Hence, a durable waterproof handle housing cannot be provided by such conventional design.

The present disclosure provides a handle for an electrically operated personal-care implement, e.g., a handle for a toothbrush, that overcomes at least one of the above-mentioned drawbacks—and that comprises a waterproof switch area on a metal tube housing. The present disclosure also provides a personal-care implement comprising such handle.

SUMMARY OF THE INVENTION

In accordance with one aspect, a handle for an electrically operated personal-care implement is provided. The handle comprises a metal tube housing having a metal wall with an opening and an inner surface, the inner surface defining an inner cavity of the housing for accommodating an energy source. The handle further comprises a switch assembly for activating the energy source. The switch assembly is arranged in the opening and seals the opening from the inner surface. The switch assembly comprises a hard switch component and a soft switch component. The hard switch component comprises a frame having a recess. The frame is attached to the inner surface of the metal wall, thereby surrounding the opening and providing an undercut between the recess and the inner surface. The undercut is open to the opening, wherein the soft switch component is positioned in the undercut to at least partially cover the opening.

In accordance with another aspect, a personal-care implement is provided, the personal-care implement comprising the handle described herein and a head.

BRIEF DESCRIPTION OF THE DRAWINGS

The invention is described in more detail below with reference to various embodiments and figures, wherein.

DETAILED DESCRIPTION OF THE INVENTION

Figure 1:
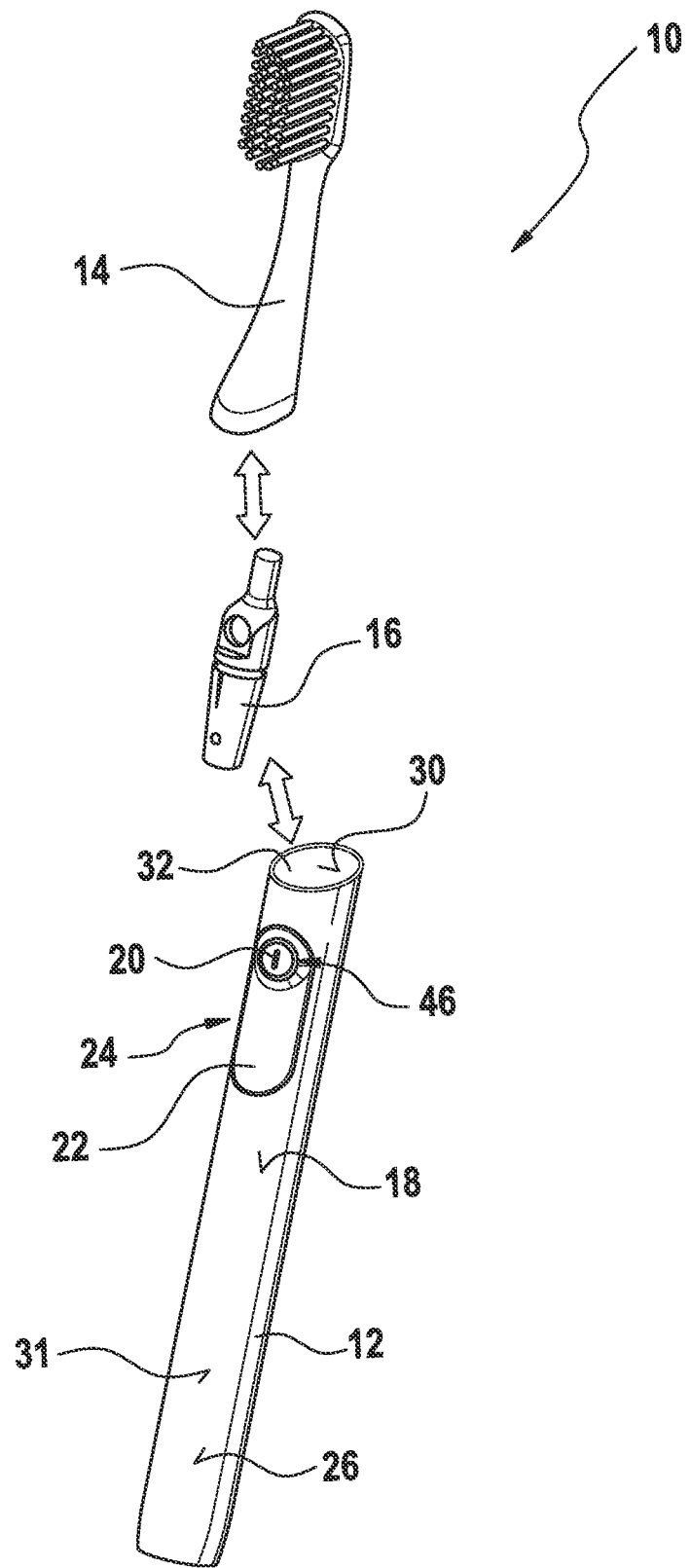
FIG. 1 shows a perspective view of an example embodiment of an oral-care implement according to the present disclosure, the implement comprising a handle having a metal tube housing and a switch assembly.

The handle suitable to be used in connection with an electrically operated personal-care implement comprises a metal tube housing. The housing is made of a metal material thereby providing a metal wall with an inner surface. Said inner surface defines an inner cavity of the housing to accommodate an energy source for operating the personal-care implement. The wall of the housing comprises an opening, e.g., a cut-out, to accommodate a switch assembly for activating the energy source, e.g., switching the electronically operated personal-care implement to an ON/OFF status. The switch assembly is attached to the inner surface of the wall, thereby sealing the opening provided in the metal wall.

For example, the personal-care implement may be battery-operated and may comprise a battery located in the inner cavity of the handle housing. The electrically operated personal-care implement comprising such handle and a head may be an electrically operated toothbrush. The head may be repeatedly attachable to and detachable from the handle. The head may be attachable to the handle via a snap-fit locking mechanism. For example, the handle may comprise a connector insertable into a hollow portion in the head, or the head may comprise a connector insertable into a hollow portion in the handle. Alternatively, a connector may be provided as a further, i.e., separate, part of the oral-care implement. Such a connector may be insertable into a hollow portion of the handle and into a hollow portion of the head, respectively, thereby providing sufficiently strong connection and stability between the head and the handle to enable a user to perform a brushing action.

While the high-quality handle of the personal-care implement is adapted for use over a longer period of time as compared to common implements, like manual toothbrushes (which are discarded after about three months of use), the relatively inexpensive head/brush refill can be exchanged on a regular basis, e.g., after about three months. This provides a cost-efficient and environmentally sustainable personal-care implement providing both, high quality handle solutions as well as cost saving opportunities, as only the head—but not the handle—has to be exchanged or re-purchased.

The switch assembly for operating the implement comprises a hard switch component and a soft switch component. The hard switch component comprises a frame with a recess. The frame of the hard switch component is attached to the inner surface of the metal wall and surrounds the opening, while the recess of the frame provides/creates an undercut that is open towards the opening to accommodate a portion of the soft switch component. The soft switch component is positioned in the undercut provided by the recess and is arranged in a manner that it covers at least partially the opening.

The metal tube housing may deliver an electrically operated personal-care product providing an improved premium consumer delight in contrast with housings made from plastic materials. Beside higher value impression and comfortable haptic, the use of metal material also allows for relatively low wall thicknesses of the housing to enable an overall slim product design. Such slim product design drives premium consumer perception and improved handling properties. A wall thickness of from about 0.4 mm to about 1 mm may create a durable metal wall handle, while ensuring highly favorable product perception. The thickness of the metal wall may be from about 0.4 mm to about 1.2 mm, preferably from about 0.5 mm to about 1 mm.

For example, the metal tube housing may be made from stainless steel and/or aluminum. Such materials are highly durable and allow for slim product designs.

Typical prior-art housings for electrical hand-held devices are usually made from plastic materials. While the housing itself is molded out of hard-plastic material, like PP or ABS, such devices often comprise a switch area molded out of soft elastomeric material, like TPE, to form a membrane that allows the actuation of a switch located inside the housing. By overholding the soft component on the hard-plastic housing, a waterproof housing assembly can be achieved only if the right material combination and geometry is selected, as the sufficient bonding properties between the hard component and the soft component are crucial.

However, if a slim overall product design is to be provided, with a housing made from metal having small wall dimensions, a waterproof assembly cannot be ensured by simply overmolding the soft component onto the metal housing because the bonding area is not sufficiently large, due to the low wall thickness and reduced freedom to design such metal tube housing (vs. free-formed plastic parts).

To enable the provision of a waterproof switch assembly (i.e. a durable and waterproof sealing/bonding between the switch assembly and the metal material) in connection with a metal tube housing having small wall dimensions (e.g., between about 0.4 mm and about 1.2 mm), without the need of using separate sealing elements, the present disclosure provides a switch assembly comprising a hard switch component and a soft switch component. The hard switch component comprises a frame with a recess which in turn creates an undercut when attached to the inner surface of the housing. The frame surrounds the opening while the undercut provided between the recess and the inner wall surface is open towards the opening. The soft switch component is positioned in said undercut and is supported by the opposing walls of the recess and inner wall surface, respectively. The soft switch component is arranged in a manner that it covers at least partially the opening. The hard switch component may be fixed within the housing by gluing and/or by other suitable means, including but not limited to substance-to-substance bonds, mechanically interlocking or frictional connections. The soft switch component may be provided by overmolding. The hard switch component can be further supported by a chassis inserted into the inner cavity of the housing. The chassis may comprise a carrier holding components for electrically operating the personal-care implement, e.g., a motor, electronics, and an energy source, e.g., a battery.

The recess of the frame of the hard switch component forming the undercut allows for solid anchoring of the soft switch component. The undercut can be filled with the soft component, e.g., during an overmolding process. Such undercut allows for bonding of the soft switch component on at least two opposite sides (see FIG. 8 and description below). Neither a force applied from the outside of the housing onto the switch component, nor a force applied from the inside of the housing results in significant peel stress on the bonding area as the frame provides a counterforce and holds the soft switch component in place. A switch assembly according to the present disclosure can be seamlessly integrated into the opening in the metal tube housing and can seal the opening in a substantially waterproof manner Such design prevents water, toothpaste, and saliva from entering the housing. Thus, a hygienic electrically operated toothbrush can be provided.

The handle according to the present disclosure enables the provision of a slim and sleek housing of an electrically operated personal-care implement. While the use of a metal material drives premium consumer perception and high durability, the handle can be sustainably used over a long period of time. Further, the slim housing enables users to perform a well-coordinated brushing technique and also improves the sensory feeling during brushing.

In contrast to the present disclosure, simply overmolding the soft switch component onto the metal tube housing cannot provide a durable waterproof handle housing as the bonding force between the soft switch component and the metal tube housing is not sufficiently strong; the bonding area between the two components (soft switch component and metal tube housing) is not sufficiently large and no counterforce is provided to hold the soft switch component in place. If a force is applied onto the switch component to activate the electrically operated implement, peel stress occurs in the bonding area, which significantly weakens the bonding connection. A weakened bonding connection may cause fine cracks or crevices allowing water to enter the inner cavity of the handle's metal housing.

The hard switch component of the present disclosure may be made from hard-plastic material, e.g. from acrylonitrile butadiene styrene (ABS) and/or acrylonitrile styrene acrylate (ASA), while the soft switch component may be made from soft elastomeric material, e.g., thermoplastic elastomers (TPE). TPE adheres well to metal and to hard plastic materials, like ABS and/or ASA.

The opening accommodating the switch assembly in the housing may be, e.g., a cut-out provided in the metal wall by laser cutting. The metal wall circumferencing the opening may define an angle α of 90° or less between its outer surface and the neighboring surface/side wall. If angle α is less than 90°, the bonding area between the metal wall and the soft switch component is slightly increases which results in even better bonding properties.

The frame of the hard switch component may comprise at least two protrusions for precisely positioning/centering the hard switch component onto the inner surface of the metal wall during assembling. Such protrusions may help to define the position of the hard switch component in respect to the metal tube housing thereby facilitating manufacturing.

The hard switch component may also comprise a lever arm that may extend into the opening provided in the metal wall. The lever arm may comprise a button element, also positioned within the opening. At least a portion of the button element may not be covered by the soft switch component, e.g., when it is injection-molded over the hard switch component. The material of the hard switch component may be provided in a color different from the color of the soft switch component, to precisely indicate where the user shall put/rest his finger to activate the switch assembly of the personal-care implement.

The handle may comprise magnetic/ferromagnetic material allowing for hygienic storage of the oral-care implement by magnetically attaching the handle to a magnetic holder, provided, e.g., on a wall. If the personal-care implement is a toothbrush, remaining water, toothpaste slurry, and saliva can drain off from the brush. The oral-care implement can dry relatively quickly. Consequently, bacteria growth can significantly be reduced, thereby rendering the oral-care implement more hygienic. In contrast to a common toothbrush, stored in a toothbrush beaker, where drained fluids get collected and accumulated at the bottom of the beaker, the brush according to the present disclosure is exposed to wet conditions over a significantly shorter period of time.

The magnetic holder may have the form of a flat disk attachable to a wall. Such flat disk may have an easy-to-clean surface. Further, a user needs just to bring the oral-care implement in close proximity to the magnetic holder to have the oral-care implement attached thereto automatically. No precise positioning or threading (as with common toothbrush holders) is required. If the magnetic properties are merely provided in the handle, and not in the head, the head portion cannot accidentally be attached to the magnetic holder, thereby reducing the risk that the magnetic holder gets soiled.

The handle or part of the handle may be electroplated to add improved appearance and a pleasant feel. Thermoplastic elastomers are well-suited for electroplating as they allow for the creation of both hard and soft composite components to be electroplated selectively in one operation.

For example, the handle may comprise a thumb rest made from a thermoplastic elastomer material and/or from a polypropylene material. These materials can be easily injection-molded over the metal tube housing. Such thumb rest may provide the handle with improved handling properties, e.g., with anti-slip properties to improve maneuverability of the personal-care implement under wet conditions, e.g., when the user brushes the teeth. The thumb rest may be made from a thermoplastic elastomer material having a Shore A hardness from about 30 to about 60, or to about 40, to prevent the oral-care implement from being too slippery when used in wet conditions. At least a portion of the thumb rest may have a concave shape with an angle α from about 20° to about 25°, or to about 24°, with respect to the area of the remaining portion of the thumb rest. The thumb rest or a gripping region may be attached onto the front surface of the handle in the region close to the proximal end, i.e., closest to the head. The thumb rest may comprise a plurality of ribs, e.g., extending substantially perpendicular, parallel, or diagonal relative to the longitudinal axis of the oral-care implement. Such ribs may allow users/consumers to use the oral-care implement with even more control, so that the user/consumer can better grasp and manipulate the handle of the oral-care implement during brushing. Such handle may provide further improved control and greater comfort during brushing, in particular in wet conditions.

Thermoplastic elastomer material may form the thumb rest on the front surface of the oral-care implement and/or a palm grip on the back surface opposite to the front surface to be gripped by the user's/consumer's fingers and thumb. Such handle configuration may even further resist slippage during use.

If the personal-care implement is a toothbrush, tooth cleaning elements, e.g., a bundle of filaments forming one or a plurality of tufts, may be attached to the toothbrush head by means of a hot-tufting process. One method of manufacturing the head with tufts of filaments embedded in the head may comprise the following steps: In a first step, tufts are formed by providing a desired amount of filaments. In a second step, the tufts are placed into a mold cavity so that ends of the filaments that are supposed to be attached to the head extend into said cavity. The opposite ends of the filaments not extending into said cavity may be either end-rounded or not end-rounded. For example, the filaments may be not end-rounded in case of tapered filaments having a pointed tip. In a third step, the head is formed around the ends of the filaments extending into the mold cavity by an injection molding process, thereby anchoring the tufts in the head. Alternatively, the tufts may be anchored by forming a first part of the head—a so called "sealplate"—around the ends of the filaments extending into the mold cavity, by an injection molding process, before the remaining part of the oral-care implement is formed.

Before the beginning of the injection-molding process, the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the oral-care implement. In other words, the tufts attached to the head by means of a hot-tufting process are not doubled over a middle portion along their length and are not mounted in the head by using an anchor/staple. Instead, the tufts are mounted on the head by an anchor-free tufting process.

Alternatively, the head for the oral-care implement may be provided with a bristle carrier having at least one tuft hole, e.g., a blind-end bore. A tuft comprising a plurality of filaments may be fixed/anchored in said tuft hole by a stapling process/anchor-tufting method. This means that the filaments of the tuft are bent/folded around an anchor, e.g., an anchor wire or anchor plate, made, e.g., of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner Since the filaments of the tuft are bent around the anchor in a substantially U-shaped configuration, a first limb and a second limb of each filament extend from the bristle carrier in a filament direction. Filament types suitable for a stapling process are also called "two-sided filaments". Heads for oral-care implements manufactured by a stapling process can be provided in a relatively low-cost and time-efficient manner.

The following is a non-limiting discussion of example embodiments of oral-care implements and parts thereof in accordance with the present disclosure.

FIG. 1 shows a personal-care implement 10, in this specific embodiment an electrically operated oral-care implement, i.e., a toothbrush 10. The toothbrush 10 comprises a handle 12 and a head 14. The head 14 is repeatedly attachable to and detachable from the handle 12, e.g., by means of a connector 16. The connector 16 may be made from stainless steel and/or plastic material with or without glass-fibers. The connector 16 may comprise a spring-loaded ball element comprising a ball and a spring, wherein the spring applies a radial force onto the ball in a direction towards an outer lateral surface of the connector. The connector 16 may be inserted into the inner cavity of the handle 12 and fixed therein e.g., by gluing, welding, and/or press-fitting. Alternatively, the connector 16 may be inserted into the handle's inner cavity mounted to the handle thereby providing some degree of movement of the connector in relation to the housing to allow the use of a pressure sensor.

The handle 12 comprises a switch assembly 24 located in the housing for activating an energy source arranged within the handle 12 so that the electrical toothbrush 10 is operational. The electrical toothbrush 10 can be switched in an ON/OFF status by actuating the switch assembly 24.

Figure 2:
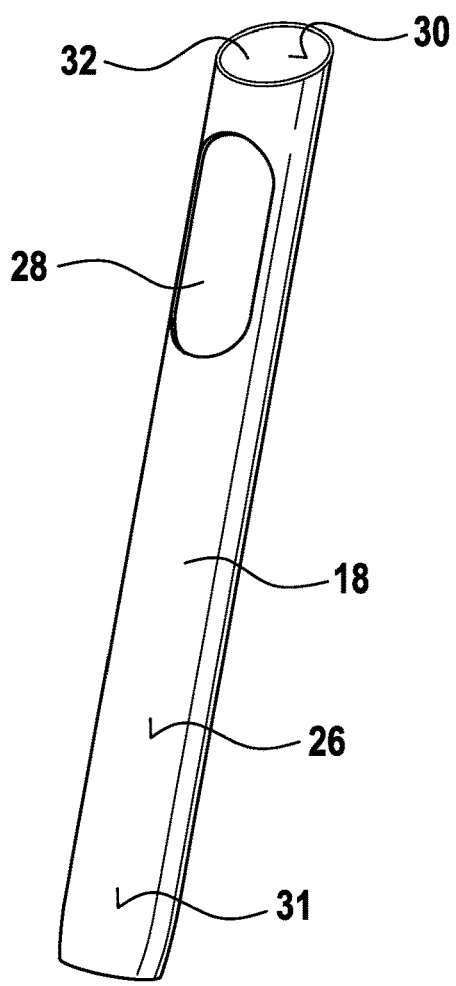
FIG. 2 shows a perspective view of the metal tube housing of FIG. 1.
Figure 3:
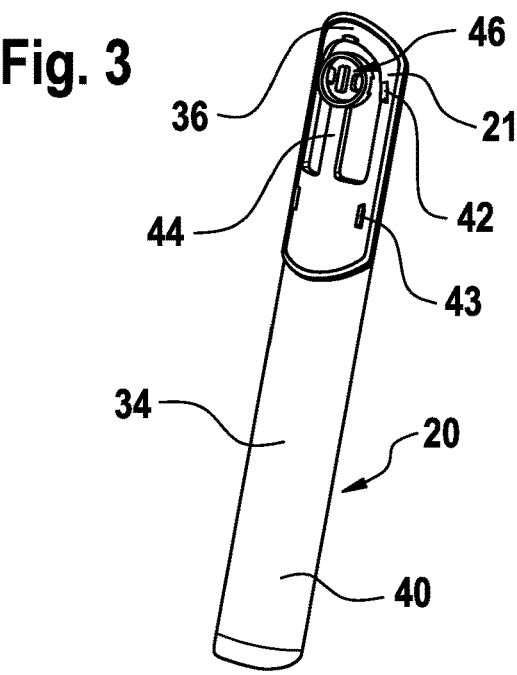
FIG. 3 shows a perspective view of a hard switch component of the switch assembly of FIG. 1.
Figure 4:
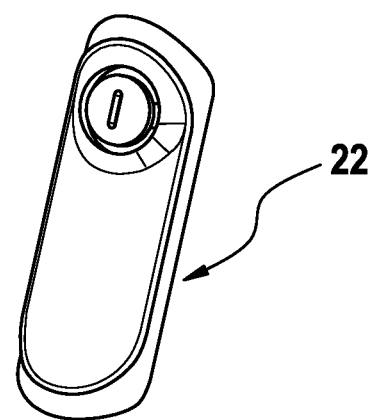
FIG. 4 shows a perspective view of a soft switch component of the switch assembly of FIG. 1.
Figure 5:
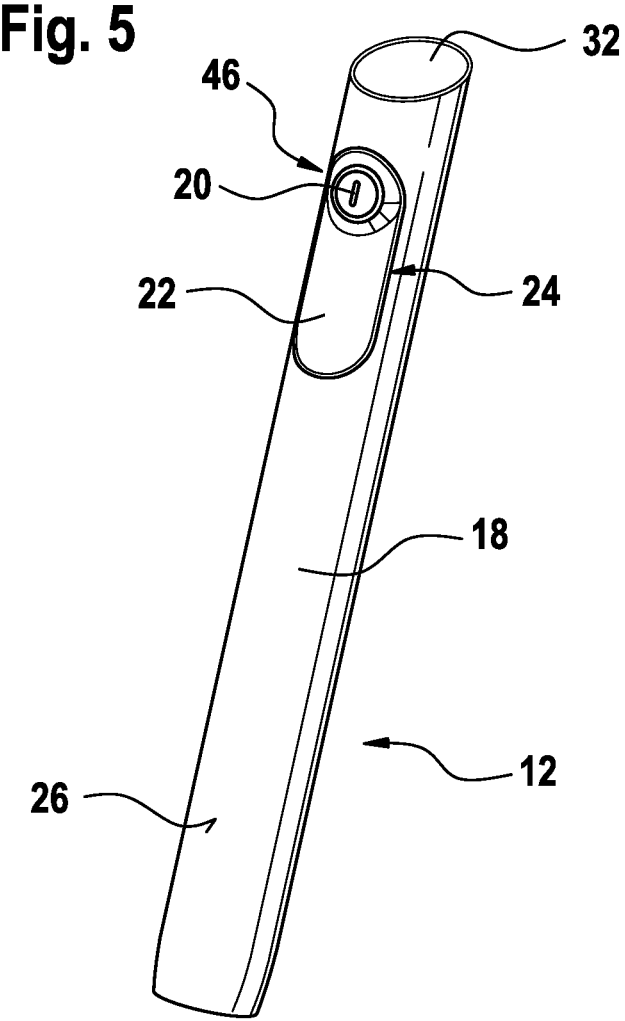
FIG. 5 shows a perspective view of the metal tube housing of FIG. 2, the hard switch component of FIG. 3, and the soft switch component of FIG. 4, in an assembled state.
Figure 6:
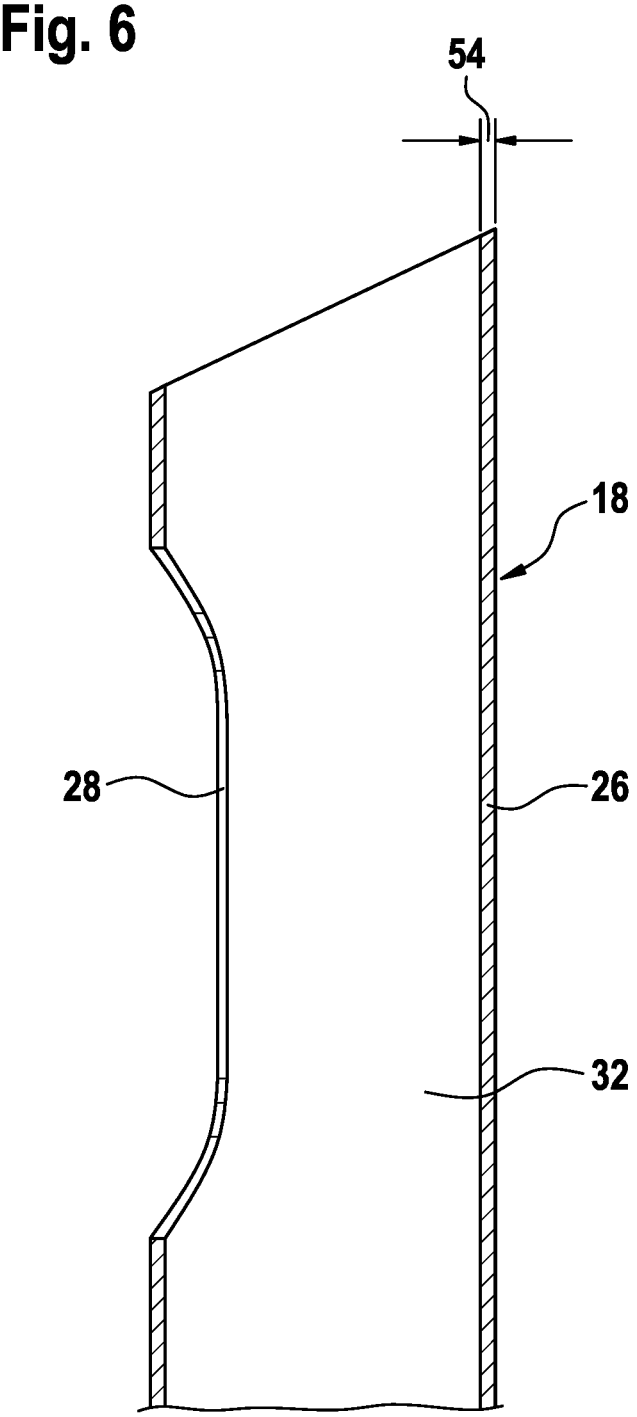
FIG. 6 shows a cross-sectional view of the metal tube housing of FIG. 2.

The housing of the handle 12 comprises substantially three parts as shown in FIGS. 2, 3 and 4, respectively: a metal tube housing 18 (FIG. 2), a hard switch component 20 (FIG. 3), and a soft switch component 22 (FIG. 4). FIG. 5 shows the metal tube housing 18, and the hard and the soft switch components 20, 22 in an assembled state.

As is shown in FIG. 2, the metal tube housing 18 has a metal wall 26 provided with an opening 28 for receiving the switch assembly 24. The metal wall 26 has an inner surface 30 defining an inner cavity 32 for accommodating the energy source, e.g., a battery. The metal tube housing 18 may be made from stainless steel and/or aluminum to provide high durability as well as high-quality perception and appearance of the overall product. The metal wall 26 may have a thickness 54 (extending between the inner surface 30 and an outer surface 31) of from about 0.4 mm to about 1.2 mm, or from about 0.5 mm to about 1 mm, which provides an overall slim product design.

The switch assembly 24 for activating the energy source comprises the hard switch component 20 (FIG. 3) and the soft switch component 22 (FIG. 4). Both components 20, 22 are located within the opening 28 provided in the metal wall 26 of the housing 18. The switch components 20, 22 are arranged in a manner that the switch assembly 24 seals the opening 28 in a substantially waterproof manner.

While the hard switch component 20 may be molded from hard-plastic material, e.g., from acrylonitrile butadiene styrene (ABS) and/or acrylonitrile styrene acrylate (ASA), the soft switch component 22 may be made from soft elastomeric material, e.g., from thermoplastic elastomers (TPE). TPE adheres well to metal material as well as to ABS and ASA.

Figure 7:
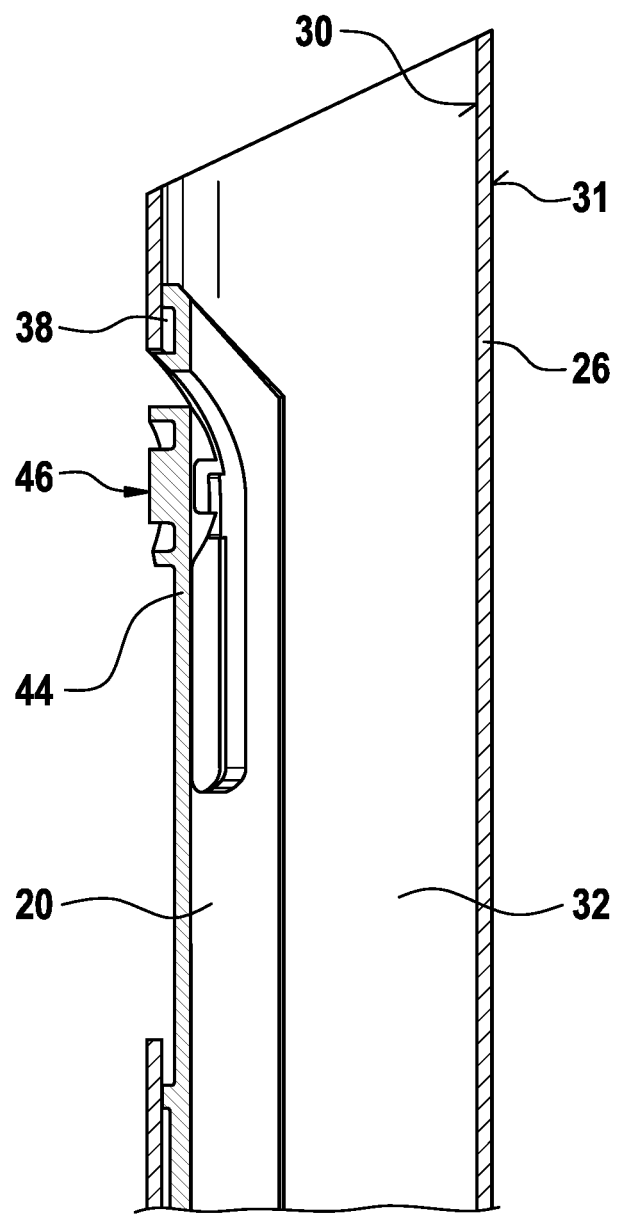
FIG. 7 shows a cross-sectional view of the metal tube housing of FIG. 2 and the hard switch component of FIG. 3 in an assembled state.
Figure 8:
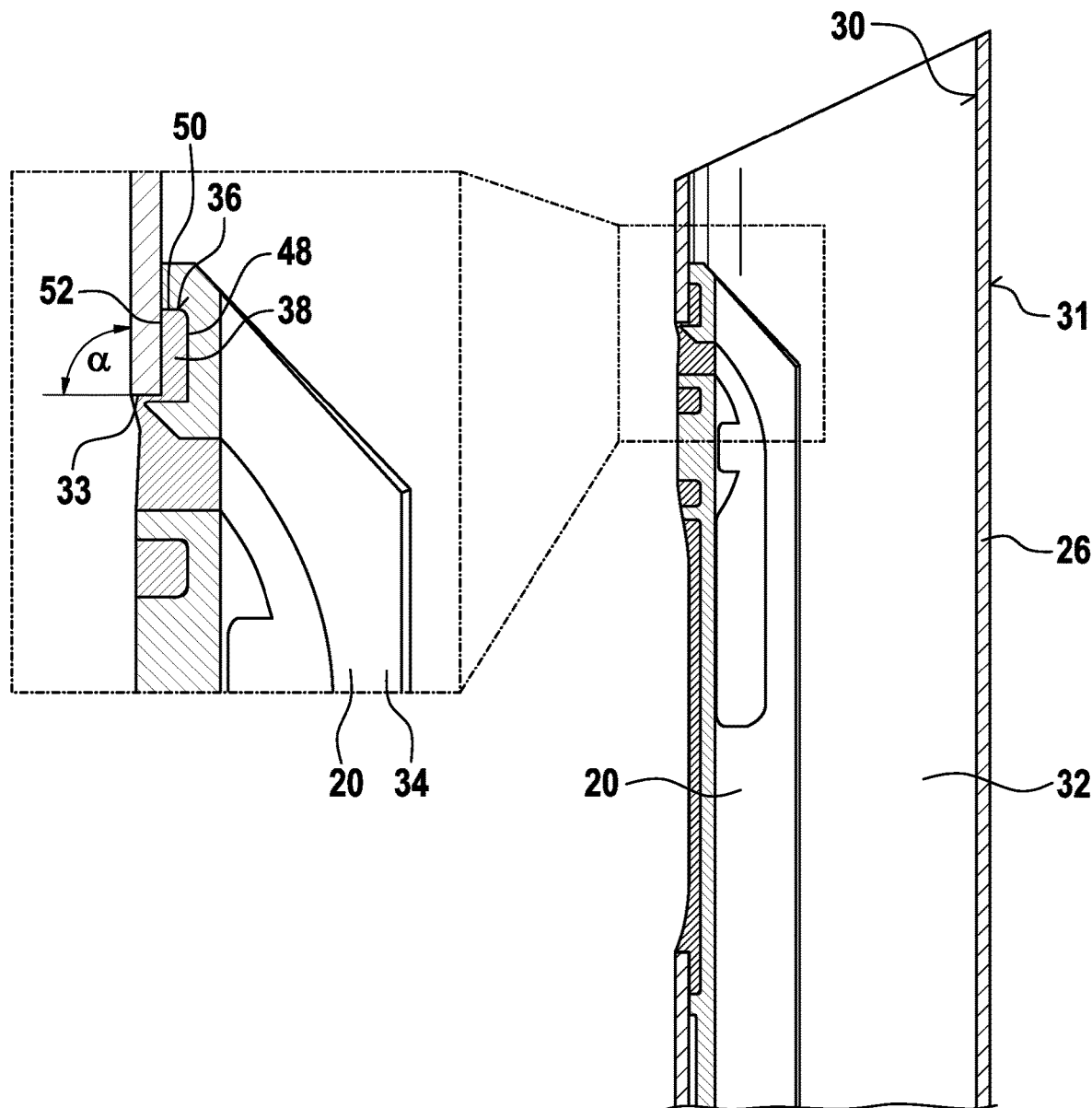
FIG. 8 shows a cross-sectional view of the housing shown in FIG. 5.

As is shown in FIG. 3, the hard switch component 20 comprises a frame 34 having a recess 36. The frame 34 is attached to the inner surface 30 of the metal wall 26 thereby surrounding (circumferencing) the opening 28 in the metal tube housing 18 (FIGS. 7 and 8). The recess 36 creates an undercut 38 in which the soft switch component 22 is positioned and securely fixed (FIG. 8). The hard switch component 20 may be connected to the inner surface 30 of the housing 18 by gluing, i.e., glue may be applied onto an area 40 of the frame 34, and then the frame gets connected to the inner surface 30 of the housing 18. Fixation of the hard switch component 20 on the inner surface may, alternatively, be provided by means of substance-to-substance bonds, mechanically interlocking, or frictional connections. The frame 34 of the hard switch component 20 may comprise at least two protrusions 42, 43 that help positioning the hard switch component 20 onto the inner surface 30 of the metal wall 26; to this end the inner surface 30 may comprise respective recesses to receive the protrusions 42, 43.

The hard switch component 20 may further comprise a lever arm 44 comprising a button element 46 at the distal end of the lever arm 44. The lever arm 44 and the button element 46 may extend into the opening 28 of the metal wall 26.

The material forming the softs which component 22 may be overmolded over the lever arm 44 and partially over the button element 46, thereby keeping a portion of the button element 46 exposed to provide an indication where a user should place a finger to activate the switch assembly 24. To this end, the color of the material of the hard switch component 20 and the color of the material of the soft switch component 22 may be different, to provide a clear and easily visible indication. The material of the soft switch component 22 covers any remaining open area of the opening 28 and is fixed in the undercut 38 provided between the recess 36 and the inner surface 30 of metal wall 26.

To further strengthen the bonding properties between the material of the soft switch component 22 and the metal wall 26 by slightly increasing the bonding area, the metal wall 26 surrounding the opening 28 may define an angle α of 90° or less between the outer surface 31 and the neighboring surface 33.

The housing assembly, comprising the metal tube housing 18 and the switch components 20, 22, allows for solid anchoring of the soft switch component 22. The recess 36 of the hard switch component 20, together with the inner surface 30, creates a defined undercut, i.e., a cavity that can be filled with the material of the soft switch component 22 during a molding process. The recess facilitates bonding of the soft switch component 22 at three sides 48, 50, 52. Neither a force applied from the outside of the handle, nor a force applied from the inside onto the soft switch component 22 results in peel stress as the frame of the hard switch component 20 holds the softs which component 22 in place. By overmolding the soft switch component 22, a substantially waterproof and durable seal can be provided, which seal may prevent water, toothpaste, and/or saliva from entering the inside/inner cavity 32 of the housing 18.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement, or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A handle (12) for an electrically operated personal-care implement (10), the handle (12) comprising a metal tube housing (18) having a metal wall (26) with an opening (28) and an inner surface (30), the inner surface (30) defining an inner cavity (32) of the housing (18) for accommodating an energy source, the handle (12) further comprising a switch assembly (24) for activating the energy source, the switch assembly (24) being accommodated in the opening (28) and sealing the opening (28) from the inner surface (30) of the metal wall (26), the switch assembly (24) comprising a hard switch component (20) and a soft switch component (22), the hard switch component (20) comprising a frame (34) with a recess (36), the frame (34) being attached to the inner surface (30) of the metal wall (26) thereby surrounding the opening (28) and providing an undercut (38) between the recess (36) and the inner surface (30), the undercut (38) being open to the opening (28), wherein the soft switch component (22) is positioned in the undercut (38) and covers at least partially the opening (28).

2. The handle of claim 1, wherein the metal tube housing (18) is made from at least one of stainless steel and aluminum.

3. The handle of claim 1, wherein the metal wall (26) has a thickness (54) of from about 0.4 mm to about 1.2 mm.

4. The handle of claim 3, wherein the metal wall (26) has a thickness (54) of from about 0.5 mm to about 1 mm.

5. The handle of claim 1, wherein the switch assembly (24) seals the opening (28) in the metal wall (26) in a substantially waterproof manner.

6. The handle of claim 1, wherein the metal wall (26) surrounding the opening (28) defines an angle α between an outer surface (31) of the wall (26) and a neighboring surface (33) of the wall (26), wherein the angle α is 90° or less.

7. The handle of claim 1, wherein the inner cavity (32) of the metal tube housing (18) comprises a battery for operating the personal-care implement (10).

8. The handle of claim 1, wherein the frame (34) of the hard switch component (20) comprises at least two protrusions (42, 43) for positioning the hard switch component (20) onto the inner surface (30) of the metal wall (26).

9. The handle of claim 1, wherein the hard switch component (20) comprises a lever arm (44) extending into the opening (28) of the metal wall (26).

10. The handle of claim 9, wherein the lever arm (44) comprises a button element (46) positioned within the opening (28) of the metal wall (26).

11. The handle of claim 10, wherein at least a portion of the button element (46) is not covered by the soft switch element (22).

12. The handle of claim 1, wherein the hard switch component (20) is made from a hard-plastic material.

13. The handle of claim 12, wherein the hard switch component (20) is made from acrylonitrile butadiene styrene (ABS) and/or acrylonitrile styrene acrylate (ASA).

14. The handle of claim 1, wherein the soft switch component (22) is made from a soft elastomeric material.

15. The handle of claim 14, wherein the soft switch component (22) is made from thermoplastic elastomers (TPE).

16. A personal-care implement (10) comprising the handle (12) of claim 1 and a head (14).

17. The personal-care implement of claim 16, wherein the personal-care implement is an electrically operated toothbrush.

18. The personal-care implement of claim 16, wherein the head (14) is repeatedly attachable to and detachable from the handle (12).

* * * * *